United States Patent
Chen et al.

(10) Patent No.: US 8,429,758 B2
(45) Date of Patent: *Apr. 23, 2013

(54) SYSTEM AND METHOD FOR PRIVACY PROTECTION USING IDENTIFIABILITY RISK ASSESSMENT

(75) Inventors: Weifeng Chen, Amherst, MA (US); Zhen Liu, Tarrytown, NY (US); Anton Riabov, Ossining, NY (US); Angela Marie Schuett, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,341

(22) Filed: Jul. 27, 2012

(65) Prior Publication Data
US 2012/0291144 A1  Nov. 15, 2012

Related U.S. Application Data (63) Continuation of application No. 12/132,828, filed on Jun. 4, 2008, now Pat. No. 8,332,959, which is a continuation of application No. 11/480,677, filed on Jul. 3, 2006, now abandoned.

(51) Int. Cl.
*G06F 21/00* (2006.01)
*G06N 5/02* (2006.01)

(52) U.S. Cl.
USPC ............... 726/30; 726/25; 726/28; 726/29; 713/182; 713/193; 706/52

(58) Field of Classification Search ............... 726/1–36; 713/168, 182, 193; 706/52
See application file for complete search history.

(56) References Cited

U.S. PATENT DOCUMENTS

| | | | |
|---|---|---|---|
| 7,003,669 B2* | 2/2006 | Monk | 713/182 |
| 7,900,259 B2* | 3/2011 | Jeschke et al. | 726/25 |
| 2004/0024693 A1* | 2/2004 | Lawrence | 705/38 |
| 2004/0049517 A1* | 3/2004 | Singh | 707/102 |
| 2007/0233787 A1 | 10/2007 | Pagan | |
| 2009/0228990 A1 | 9/2009 | Chen et al. | |

FOREIGN PATENT DOCUMENTS

CA  2345805 A1 * 11/2002

OTHER PUBLICATIONS

Latanya Sweeney "k-Anonymity: A Model for Protecting Pivacy", International Journal on Uncertainty, Fuzziness and Knowledge-based Systems,; 10(5). 2002; pp. 557-570.

T.M. Truta, F. Fotouhi and D. Barth-Jones, "Assessing global disclosure risk in masked metadata", in Proceedings of the 2004 ACM Workshop on Privacy in The Electronic Society, Washington DC, USA; 2004; pp. 85-93.

Pau-Chen Cheng, et al,"System and Method for Fuzzy Multi-Level Security", Unpublished U.S. Appl. No. 11/123,998, filed May 6, 2005; 79 pages.

\* cited by examiner

*Primary Examiner* — Andrew L Nalven
*Assistant Examiner* — Amir Mehrmanesh
(74) *Attorney, Agent, or Firm* — Tutunjian & Bitetto, P.C.; William Stock (57) ABSTRACT

A risk assessment system and method includes an information system configured to disclose information to a third party. A risk determination model is configured to compute identifiability risk for on one or more records in storage. The identifiability risk is compared to a threshold prior to being disclosed wherein the information system is informed of the identifiability risk exceeding the threshold prior to disclosure to the third party.

13 Claims, 4 Drawing Sheets

SYSTEM AND METHOD FOR PRIVACY PROTECTION USING IDENTIFIABILITY RISK ASSESSMENT

CROSS REFERENCE TO RELATED APPLICATIONS

This application is a Continuation application of co-pending U.S. patent application Ser. No. 12/132,828 filed Jun. 4, 2008, which itself is a Continuation application of U.S. patent application Ser. No. 11/480,677 filed Jul. 3, 2006, now abandoned. Each patent application identified above is incorporated here by reference in its entirety.

GOVERNMENT RIGHTS

This invention was made with Government support under Contract No.: H98230-05-3-001 awarded by the U.S. Department of Defense. The Government has certain rights in this invention.

BACKGROUND

1. Technical Field

The present invention relates to privacy protection and more particularly to systems and methods employing an identifiability risk assessment to protect against disclosure of protected information.

2. Description of the Related Art

Information systems deployed and maintained by businesses of different sizes often store personal information collected from their clients. Similarly, information systems of government organizations, such as the Internal Revenue Service, store personal data about citizens, as well as other private data collected from businesses. In recent years, these information systems have increasingly become computerized.

Computer-based information systems enable anytime instant access to the data, and on-the-fly cross-referencing of large volumes data. Computerization is also critical for the implementation of data mining methods and other automated and highly efficient data analysis techniques, which in turn help reduce costs and improve the agility and the efficiency of businesses and governments.

Recent advances in communication technologies, wireless and cellular networks and widespread availability of the Internet enable instant access to the information systems and computational resources from virtually anywhere, via easily obtainable equipment such as a laptop with a wireless card. Together with the benefits that the now ubiquitous digital technologies have brought, they have also brought new dangers.

Currently, it is becoming increasingly easy to gain unauthorized access to personal data. Identity theft is a very serious and real threat to anyone who is sharing personal information with companies in exchange for services, credit, etc. As a consequence, safeguarding of personal information becomes a highly important objective for businesses and governments, and many aspects of privacy protection, such as the collection and use of information on minors or strong encryption of Internet communications, are mandated by laws or best business practices.

Two previously unsolved important problems of privacy protection arising in business and government information systems need solutions. These problems include evaluating and managing a tradeoff between privacy protection and business efficiency, and quantifying the privacy risks associated with various business operations. Solving these problems will contribute to improvements in both business transparency and business efficiency. The solutions will help streamline privacy protection processes, simplify the work of employees responsible for privacy protection, and increase the accountability of individual employees and entire organizations.

Managing the tradeoff between privacy and business efficiency: Arguably, any information collected and stored by an organization is collected with the intent of using this information, for one purpose or another. Privacy policies enacted by organizations restrict the purposes for which the information can be used. In this policy-controlled mode, privacy protection is equivalent to the enforcement of policy compliance. For any save more permissive policies, there can be practical situations where the potential benefits resulting from a particular business operation are not realized, because the operation requires the use of information in conflict with privacy policy. Therefore, the privacy policies are controlling the tradeoff between the needs of business efficiency and the needs of privacy protection.

Developing privacy policies is an extremely difficult task that any organization must perform when it establishes a system for storing personal or private information. It is especially difficult in information systems where automated policy enforcement is implemented, because for such systems, the policy is specified as a set of formal automatically verifiable rules. In some respects the task of writing policies can be compared to the process of developing the legislation. This analogy can be literal, if the policy is stipulated by law.

For these reasons, the policy writers often prefer to err on the side of caution, and prohibit the use of information when in doubt. Also as a result, the policies mandated internally by an organization are typically more restrictive than the published policies, and reflect not only the law and the published commitments of the organization, but also the best practices requirements as seen by policy writers.

The employees responsible for the use of information are often required to determine whether a particular use of information is in violation of the policy. For example, in some situations, the internal policy can be violated in order to allow an extremely critical operation, as long as the externally published policy and laws are not violated. If the internal policy is enforced automatically, such an operation may require the intervention of high-level management to circumvent the normal enforcement controls. This problem can be partially addressed by policies that permit wider access in exceptional circumstances, e.g., if sufficient justification is provided. However, the currently existing approaches do not provide sufficient assistance to the organization's employees responsible for making decisions, and often they are forced to violate internal policies in order to get their job done.

SUMMARY

A risk assessment system and method includes an information system configured to disclose information to a third party. A risk determination model is configured to compute identifiability risk for on one or more records in storage. The identifiability risk is compared to a threshold prior to being disclosed wherein the information system is informed of the identifiability risk exceeding the threshold prior to disclosure to the third party.

Another risk monitoring system includes an information system configured to disclose information to an entity, and a risk determination model configured to compute identifiability risk for on one or more records in storage. A privacy monitor is configured to receive the one or more records being released, and prior to disclosing the one or more records to the entity, the privacy monitor is configured to detect whether the identifiability risk exceeds a threshold and perform a function to mitigate unauthorized disclosure of the records to the entity.

A method for privacy protection includes evaluating identifiability risk for one or more records in storage using a risk assessment model, comparing the identifiability risk with a threshold to determine whether the one or more records can be disclosed to a third party without violation of privacy criteria, and disclosing the one or more records if disclosure is acceptable based on the comparing step.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with the present principles address at least two previously unsolved important problems of privacy protection arising in business and government information systems. These problems include evaluating and managing a tradeoff between privacy protection and business efficiency, and quantifying the privacy risks associated with various business operations. The present embodiments provide systems and methods for evaluating and managing the tradeoffs between business efficiency and privacy protection.

The systems and methods are preferably based on a privacy risk quantification method for the estimation of the numeric value of privacy risk associated with a particular use of protected information. An organization's employees cannot be relieved from the duty of making their own, frequently highly subjective, estimates of the risks, and can be provided with a system which will automatically compute the risk value and keep the records of the value, the employee's decision and the employee's justification for the decision.

Such a system may include enforcement controls for limiting the risk that an employee can take without consulting with others, for example based on work experience—more experienced employees may be trusted to take higher risks. Justification requirements and risk mitigation procedures of varying degrees can be established, such that the requirements and the procedures are enforced automatically depending on the risk estimate. Possible risk mitigation measures may include an audit that takes place after the employee decides to perform a particular action leading to use of information, post-action management review, or pre-action management approval requirement.

A noted approach to evaluation of security risks is described in commonly assigned U.S. patent Ser. No. 11/123,998, to Cheng et al. entitled "SYSTEM AND METHOD FOR FUZZY MULTI-LEVEL SECURITY", filed May 6, 2005, and incorporated herein by reference. Many of the ideas described in Cheng et al. can be applied in privacy protection scenarios. Access control decisions in privacy protection context translate into the decisions about allowing the use of information for specific purposes.

Assessment of the privacy risks associated with business operations: People generally accept the necessity of providing personal information to businesses or governments. When asked to provide such information, people usually know the entity they are providing the information to, and can decide whether the information should be provided. However, in practice it is very hard to ensure that the information indeed is provided to one single principal constituting a business or a government. The information is often shared with other principals: e.g., the employees of the business or government, business partners, and so on. In this situation it is especially difficult to limit the distribution of private information due to possibility of misuse by trusted insiders or trusted partners.

For these reasons, it can be concluded that any use of personal or other types of private information that leads to disclosure of private information, e.g., providing the information to principals who did not have access to the information before, is associated with risk. The privacy risk can be defined as the risk that private information will be misused, or shared inappropriately.

A system for evaluation and management of privacy risks is provided and may be based on a method for risk estimation. Embodiments in accordance with present principles build upon the methods developed for the measurement of security risks, and introduce a novel quantitative measure for assessment of privacy-specific identifiably risk.

The present embodiments have significantly extended the ideas of disclosure risk estimation described in previous art to develop methods for providing consistent global privacy risk assessment both before and after the data have been disclosed to a third party. Risk estimation before actual data is disclosed can be performed based on the forecast of future data distribution. Obtaining such an estimate is important when the agreements on the conditions of sharing the data are established before the data is actually transferred from the information system to a third party, and even before the data enters the information system.

Third party or third party principal as employed herein refers to any consumer of data. The consumer may be internal or external component or entity of a given system or may be a different part of the same information system. Third party will be employed herein to refer to an entity which at least initially does not have access to sensitive information which the third party has requested or needs for an application or function.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk, storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
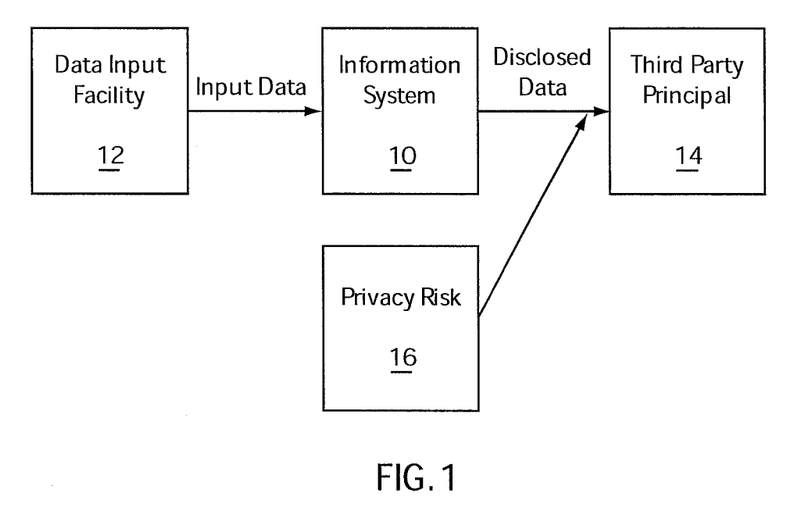
FIG. 1 is a block diagram of a stream processing model for privacy protection in accordance with one illustrative embodiment.

Referring now to the drawings in which like numerals represent the same or similar elements and initially to FIG. 1, a block diagram showing a flow of information is illustratively shown. An information system 10 receives data through a data input facility 12, processes the received data, and releases the results of the processing to a third party principal 14 (e.g., to an insider or to a partner, for example an employee of the organization that collects private data, or another information system). The release of information to third party 14 can be initiated either by a specific request by the third party 14, or automatically. The automatic release may happen on a predefined schedule, for example immediately when new input data arrives. No restrictions are placed on the operations that the information system 10 can perform on data. It is assumed that communication channels are secure, and all communicating parties have been properly identified.

In accordance with present embodiments, a method of risk assessment only provides a risk estimate 16 associated with data disclosure to the third party principal 14, and in general the separate data input facility component 12 is not required for the application of the method. Further, any business operation that needs the use of private information by employees or other third parties can be represented as a combination of operations outlined in FIG. 1. How the overall risk estimates associated with such an operation can be computed will be described. Although there can be risks associated with storing and processing the private information in the information system, this risk is not considered here, so that the focus is on the disclosure risk.

To make the distinction between private and public information, public sources may be defined as sources of information that are accessible to the third-party principal. In general settings, these sources can be those that are available to very large groups of people, such as all citizens of a country, all government employees, all clients of a multinational company, etc. Publicly available information is information obtained from public sources.

The following factors can contribute to overall risk associated with the disclosure of private information:

The type of private information being disclosed. For example, disclosing a person's taxpayer identification number is considered a much more serious violation of privacy than disclosing the phone number of the same person.

The amount of information being disclosed; The more data of the same type is released, the higher the risk that one of the records will be highly sensitive.

The availability of the disclosed private information through public sources; For example, disclosing the income of the current President of the U.S. involves no privacy risk, since by tradition since the 1970s U.S. Presidents mostly choose to make their tax returns public.

The degree to which the disclosed private information can be associated with a particular individual via cross-referencing with publicly available information; For example, disclosing social security number (SSN) 123-45-6789 and age 24, without any other information has negligible privacy risk, since although SSN is valuable information, knowing only the age of a person leaves too many candidates, e.g., all US residents 24 years of age, and each of these candidates is equally likely to have the disclosed SSN.

The context of the disclosure which may supply additional information for cross-referencing; For example, if in the previous example the SSN and age are provided as part of the list of employees of a company, it may significantly limit the number of candidates, and potentially allow to single out the identity associated with these attributes, by cross-referencing the data available on the employees The likelihood of the information misuse by the third party principal; The issue here is that the principal receiving the information will not necessarily abide by the same privacy policy that allowed the principal who is sharing the information to make the disclosure. Access control policies capture this by using credentials to reflect trustworthiness of the principal.

Security risk evaluation model described in Cheng et al., cited above, addresses the evaluation of risk of misuse of the information by the principal receiving the information. This type of risk is also relevant and important in the privacy context, and the model proposed in Cheng et al. can be used as part of privacy risk evaluation formula. However, the needs of privacy protection add another component of risk that is associated with certainty of determining the identity of the individual associated with the information being disclosed. This identification is not always trivial to deduce, but it can in many cases be achieved by using the knowledge of the context of information disclosure, and cross-referencing the information obtained from the information system with the information obtained from publicly available sources.

Existing work on the analysis of disclosure risks in statistical databases includes: T. M. Truta, F. Fotouhi and D. Barth-Jones, "*Assessing global disclosure risk in masked metadata*", *in Proceedings of the* 2004 *ACM Workshop on Privacy in The Electronic Society*, Washington D.C., USA, pp. 85-93 (hereinafter Truta et al.) and references therein. Truta et al. describes methods of risk estimation based on ideas closely related to identifiability risk. One difference that work and the present embodiments is that the present embodiments do not rely on the availability of the disclosed data, and can be applied for risk estimation before any data is presented to the third party.

The assessment of identifiability risk is performed based on the estimate of probability that the disclosed information can be used by third party principal to identify a person. For example, according to data of US Census 2000, in 2000 there was only 1 male person of Asian race in age group of 30 to 34 years old, who was living in the area of postal Zip code 10532. Therefore, if the third party principal receives information that average income of Asian male persons in Zip code 10532 with ages 30 to 34 is $54,000, the released data in fact includes very precise income information on one single person, and this disclosure is most likely privacy-violating. On the other hand, if the information about income of a male person in zip code 10504 is disclosed, that income figure can correspond to any of 3,494 males living in that zip code, and therefore has much smaller identifiability risk associated with it.

Census data is employed herein, as well as other similar data, to compute a number reflecting the identifiability risks for different combinations of attributes (e.g., zip code and age group combination). This number can be used, for example, to compare different combinations and determine the combination that is less risky to disclose. In addition to the set of attributes, the identifiability risk will also depend on public sources, on distribution of the data being disclosed, and on the information available to the third party.

Once the identifiability risk is computed, it can be combined with other types of risk to determine overall risk associated with the disclosure. How to compute the combined risk is also described.

The following definitions will be employed herein:

Adversary—the third party principal receiving the disclosed data from the information system; the use of the term adversary stresses the possibility of the malicious intent on the part of the third party principal.

Individual—a person or other entity (e.g., a company) who is the subject of privacy-sensitive information, and whose privacy is protected by privacy policy.

Attribute—a category of information, such as address, zip code, telephone number, medical history, etc. Attributes may or may not be categorical (e.g., discrete). However, it will be assumed that attributes are categorical, and it is later described how non-categorical attributes can be handled.

Population table—the set of records containing exactly one record for each individual, where for every individual the values of all applicable attributes are specified. This set reflects "global knowledge". It is possible that none of the parties in the information disclosure has the complete global knowledge information.

Sample table—the data released to the adversary, a subset of the population table; not all records and not all attributes from the population table are released in sample data. If the data processing performed by the information system (10, FIG. 1) combines attributes or records using aggregation methods, the sample data should include all of the attributes that were combined, and all of the records that were combined. Sample data may include at most one record for one individual listed in the population table.

Key attributes—those attributes in the sample table that can be used by the adversary to identify a person based on information accessible to the adversary, including public sources.

Protected attributes—those attributes in the sample table that are not known to the adversary or for which the adversary cannot establish the association with person identity. In practice, all non-key attributes included in the sample table are considered protected attributes.

Single Record Identifiability: The identifiability risk I(r) of a sample table including single record r is $$I(r) = \frac{1}{D_K(r)}$$

where $D_K(r)$ is the size of the set $C_K(r)$, i.e. $D_K(r)=|C_K(r)|$. The set $C_K(r)$ is the subset of records from the population table that includes only the records that have values of all attributes in the set of key attributes K exactly equal to the corresponding values of the same attributes in r. $D_K(r)$, referred to as cell size, is equal to the number of records in $C_K(r)$. This definition reflects the fact that the adversary will see the protected attributes of r as equally likely belonging to any individual in $C_K(r)$.

Multiple Record Identifiability: If the sample table includes records $(r_1, r_2, \ldots, r_m)$, then the identifiability risk for this sample table is:

$$I(r_1, r_2, \ldots, r_m) = 1 - \prod_{i=1}^{m}(1 - I(r_i)).$$

Predicted Single Record Identifiability: Both previous computations rely on the availability of the sample table. If the sample table is not available, the prediction of identifiability can be made based on the knowledge of the distribution of the sample records. Assume that the sample table includes 1 record, and for each individual i from the total population table, the probability that this individual is the one appearing in the sample table is $p_i$. The probabilities $\{p_i\}_{i=1}^{n}$ define fine a probability density function over the population of n individuals. Further assume that the set of key attributes K is known at the time of computation.

Let $r_i$ be a record corresponding to individual i in total population table. Then, the predicted identifiability is:

$$I_p = \sum_{i=1}^{n} \frac{p_i}{D_K(r_i)}$$

where, as before, $D_K(r_i)$ is the cell size, e.g., the number of records in the population table that have values of all attributes in the set of key attribute K equal to the values of corresponding attributes in $r_i$.

Predicted Multiple Record Identifiability: The identifiability risk can be assessed before m records are released. As in the one record prediction case described above, it is assumed that the values of the probabilities $\{p_i\}_{i=1}^{n}$ and the names of all attributes in the set of key attributes are provided as input parameters. Identifiability associated with realizing in records is calculated as:

$$I_p^{(m)} = 1 - (1 - I_p)^m$$

where $I_p$ is predicted single record identifiability, computed as described above.

Approximate Cell Size Computation: The computation of predicted identifiability provides that the values of $D_K(r)=|C_K(r)|$ can be computed. In practical implementation of the method, it may be difficult to store these values for all possible attribute combinations K, since for k attributes up to $2^k$ different combinations K can be constructed.

One possible solution to this problem is to store the complete global knowledge table. This table includes a record for every individual in the population. The records stored in the global knowledge table include values of all possible attributes. Once this table is available, the computation of the set $C_K(r)$ can be performed trivially, for example by using a known SQL SELECT operation. By definition of $C_K(r)$, it is a set of records that includes those and only those records from the population table that have the values of key attributes equal to the values assigned to the corresponding attributes in record r.

In some implementations, however, the value of identifiability risk, and therefore the value of $D_K(r)$ should be computed quickly, and the full selection operation on a large population table as described above may be too time consuming and therefore unacceptable. Further, obtaining the population table itself can be a difficult task in practice, because it needs complete information about all individuals. To address these issues an alternative method for estimating identifiability risk has been developed using approximation of values of $D_K(r)$.

The approximation is based on the following formula. Let $K = K_1 \oplus K_2 \oplus \ldots \oplus K_w$, i.e. $K = K_1 \cup K_2 \cup \ldots \cup K_w$, and $K_i \cap K_j = \phi$ for $i \neq j$. As before, let n be the size of the population (e.g., total number of individuals). Then, $D_K(r)$ can be approximately calculated as:

$$D_K(r) \approx \tilde{D}_{K_1 \ldots K_w}(r) = \frac{D_{K_1}(r) \cdot D_{K_2}(r) \cdot \ldots \cdot D_{K_w}(r)}{n^{w-1}}.$$

This approximation is based on the computation of a joint probability density function under the assumption of independent distribution of the population within each of the attribute groups $K_1, K_2, \ldots, K_w$. The approximation formula permits the computation of identifiability even in extreme cases when only the values of $D_{K_j}(r)$ for elementary sets $K_i$ (e.g., sets including only one attribute) are available.

Storing the data only for the elementary attribute sets uses exponentially smaller storage space than in the case of exact computation, and the space needed for approximate computation grows at most linearly in the number of attributes and categories of attribute values. However, the use of very small sets $K_i$ leads to higher w, and the increase in w may cause an increase of approximation error. Thus, there exists a natural tradeoff between the accuracy of approximation and the efficiency of computation. Practical implementations may choose any level of detail for which to store the cell size data, and achieve the best practical balance between efficiency and accuracy by varying the level of detail.

To show that the approximation approach is practical, experiments have been performed with census data published by the US Census Bureau. For the purpose of the following illustrative experiment, the set of attributes includes four attributes: zip code, race, sex and age group, which for brevity will be denoted by the first letter of the attribute name (e.g., Z, R, S, A). The published data provides values of $D_{ZRSA}(r)$, i.e. the most detailed information about cell sizes possible.

Figure 2:
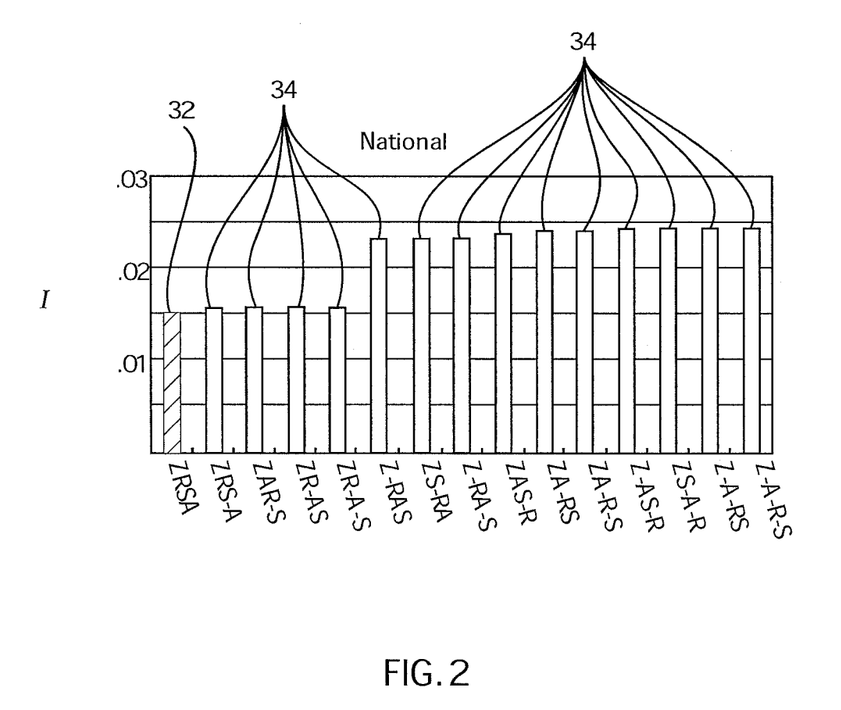
FIG. 2 is a chart showing indentifiability approximation for different combinations of attributes from US Census data in accordance with an illustrative embodiment.

Referring to FIG. 2, an Identifiability (I) approximation is shown for different combinations of attributes from US National Census data. The value of one record identifiability (I) computed based on the data is shown with a first bar 32 in the diagram. The other bars 34 show approximations computed using different decompositions of the set ZRSA, where dash ("-") separates different subsets of the attribute set used in the decomposition. In FIG. 2, it is easy to see that the identifiability value approximation is the worst when the set of attributes is decomposed into elementary components (Z-A-R-S). However, if attributes Z and R are in the same subset, the accuracy of approximation is very high. This can be explained by the fact that Zip code and Race are not independent in this data set.

Furthermore, in all cases observed in this experiment, the approximate value of the identifiability risk exceeds the true value of the risk, and therefore the use of approximation leads to a conservative risk estimation. Conservative estimation is very important for consistent protection of privacy. It means that increased risk estimation efficiency causes the system to release less information, and therefore under incomplete information or time constraints the system errs on the safe side. Note that although in this experiment risk overestimation was observed, this behavior of the approximation method is not guaranteed to hold for all populations.

This experiment also illustrates an embodiment, in which publicly available Census data is used for the computation of identifiability risk associated with a particular attribute set. The Census data has a limited number of attributes, but using the approximation formula the attributes can be combined with other attributes available in the information system. Therefore, it is possible to use Census data for computation of identifiability risks associated with more general attribute sets that include attributes other than those included in Census data.

Prediction and Enforcement (Data Analysis Cycle): One possible embodiment of predicted identifiability may combine risk prediction and risk monitoring to support the complete cycle of data analysis.

Figure 3:
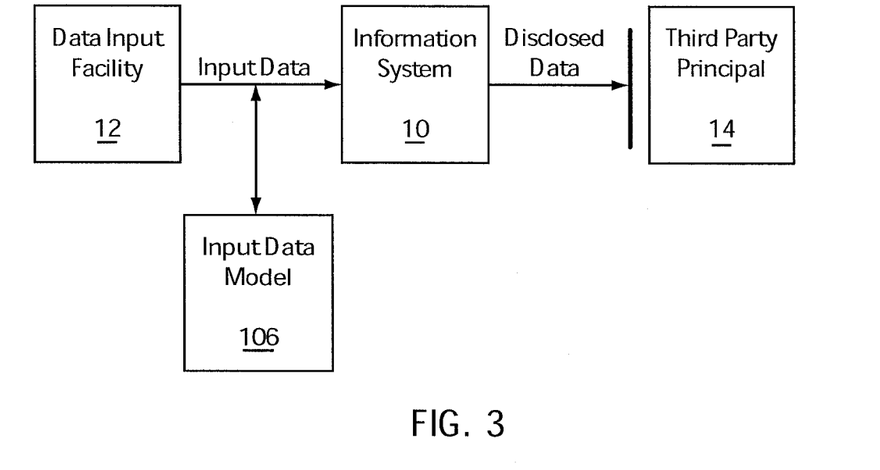
FIG. 3 is a block diagram showing a risk assessment system in accordance with one illustrative embodiment.
Figure 4:
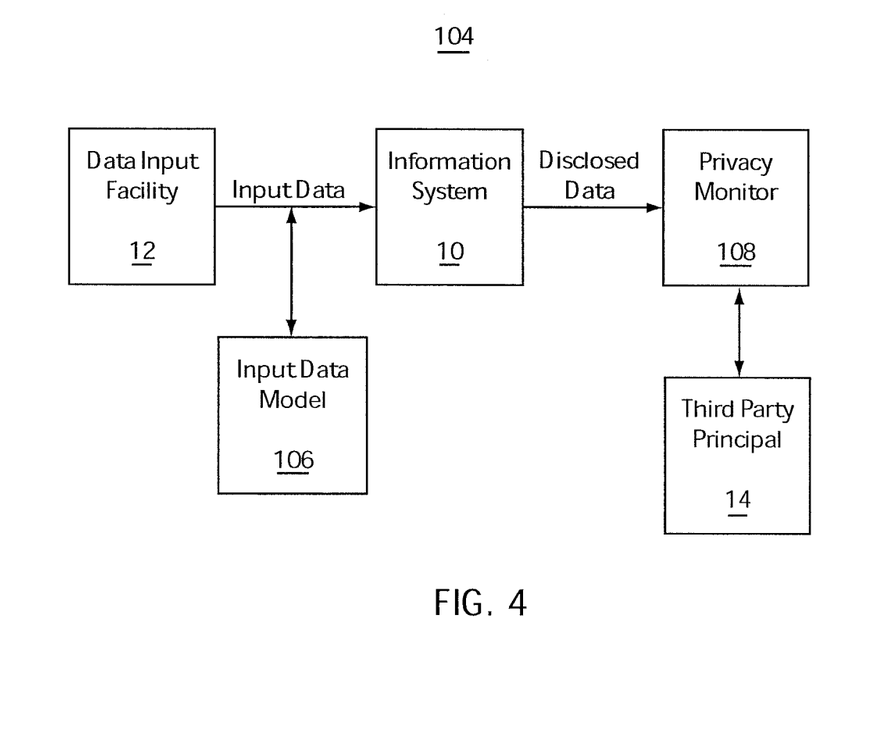
FIG. 4 is a block diagram showing a risk processing and monitoring system in accordance with another illustrative embodiment.

Referring to FIGS. 3 and 4, a risk assessment stage 102 and a processing and risk management stage 104 are illustratively shown. Stages 102 and 104 may be employed together or separately as needed. At stage 102, the results of data processing by the information system 10 are not yet released to the third party principal 14. This may happen, for example, while the information system 10 is waiting for a request to initiate data analysis and data release. At this point, the information system 10 may study the input data and build a model 106 of the data that can be used to compute the values of $\{p_i\}_{i=1}^n$ needed for initial assessment of identifiability risk $I_p$. The initial assessment is used to evaluate risk before any data is released to the third party principal 14.

Any method for modeling the input data and computing probabilities $\{p_i\}_{i=1}^n$ may be used, for example sampling and averaging. Before any data is received by the information system 10, the model 106 can be initialized in the initial state in which the probability mass is concentrated in records that belong to cells with highest identifiability (i.e., r with the smallest $D_K(r)$) for a predefined combination of attributes K, and all other records are assigned zero or near-zero probability. K can be chosen, for example, to be the largest set of key attributes.

At stage 104, when the processing and the release of the processed data to the third party principal 14 have been initiated and are in progress, the observed identifiability risk $I(r_1, r_2, \ldots, r_m)$ that can be computed based on the released set of records $\{r_1, r_2, \ldots, r_m\}$ may exceed the initial risk assessment value $I_p$. To detect this situation, a privacy monitor component 108 is added to the chain of processing between the information system 10 and the third party principal 14. This component can perform any of the following functions:

observe the data received by the third principal 14, and measure the true risk based on that data;

terminate data processing if observed risk exceeds a specified threshold (e.g. 110% of initial risk assessment $I_p$);

suppress (e.g., filter out) the records the release of which will cause the observed risk to exceed a specified threshold.

The continuous update of the input data model 106 may be performed at stage 104 as well as at stage 102. The set of $\{p_i\}_{i=1}^n$ computed based on the updated model may later be used again for initial risk assessment.

Figure 5:
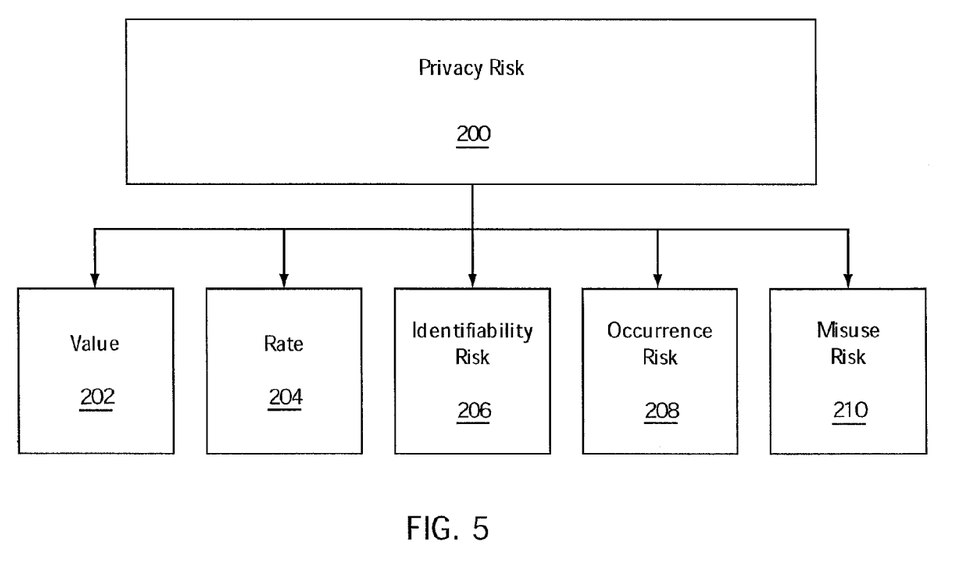
FIG. 5 is a block diagram showing exemplary risk factors affecting privacy risk in accordance with one embodiment.

Combined Privacy Risk Computation: One of the many possible embodiments using the identifiability model 106 may use the identifiability risk value to compute the overall combined privacy risk associated with the release of information. As described, the privacy risk depends on many factors. FIG. 5 shows the main factors contributing to the overall privacy risk.

Referring to FIG. 5, illustrative factors affecting privacy risk 200 are shown. These risks may include values 202, rates 204, indentifiability risk 206, occurrence risk 208 and misuse risk 210. Other factors may also have an effect. To simplify risk computation and exclude other factors contributing to the overall risk, the following assumptions may be made:

A sample table is sent to the adversary through a secure channel; therefore, there is no risk associated with the data transmission itself (although such a risk can be taken into account, if needed, through a straightforward extension).

Communicating parties are properly identified; there is no risk associated with releasing information to an untrusted principal posing as a trusted third-party principal. Based on this and previous assumptions, the identity of the adversary is known, and trustworthiness of the adversary can be evaluated, if needed.

Under these assumptions, the remaining factors include:

Value 202. The value of information.

Rate 204. The rate at which records are released.

Identifiability risk 206. The risk is defined as the probability that the released data can be associated with a particular individual.

Occurrence risk 208. The risk is defined as the probability that the released data includes private information.

Misuse risk 210. The risk is defined as the probability that the released data will be misused. The higher the sensitivity of the information, and the lower the trust level of the third party principal, the higher this risk is.

The overall privacy risk is monotone non-decreasing in all of these parameters. Below an example is given of a formula based on joint probability of events that can be used to provide an assessment of privacy risk.

Let V(i) be value of attribute i in the released dataset. Let rate r be the average number of records released per fixed time interval, e.g. per minute. Let $I_p^{(r)}$ be the predicted identifiability of r records. Let $R_o$ be the occurrence risk. Let $R_m(i)$ be the misuse risk for attribute i. Then, overall privacy risk R can be defined as the expected lost value, which is equal to the product of the loss risks and the value:

$$R = \sum_i V(i) R_m(i)(1 - (1 - R_o)^r) I_p^{(r)} R_m(i)$$

Note that the misuse risk $R_m(i)$ depends on the difference between the level of information for which the third party principal is trusted (principal credentials), and the information present within the output presented to the third party principal. A sigmoid function described in Fuzzy logic can be used to compute $R_m(i)$, as discussed in Cheng et al. incorporated by reference above.

An example of the use of a sigmoid function is as follows. Sensitivity levels may be viewed as one dimension and each category or risk as one dimension. One choice for determining misuse risk $R_m(i)$ is the sigmoid function. Let RI be the risk index and RI∈(0;+∞), then $$R_m(RI) = 1/(1 + \exp((-k) \times (RI - \text{mid})))$$

The value of this function increases very slowly when RI is much smaller than mid, it increases much faster when RI is closer to mid and saturates as RI becomes much larger than mid. The value "mid" is the risk index value where the probability is deemed to be 0.5; it is a tunable parameter. The value k is also a tunable parameter that controls the slope of the function. A dimension may have its own values for mid and k.

The choice of mid has a significant effect on the probabilities computed and that the probabilities become 1 (or very close to 1) when the value of an object is at least two orders of magnitude or a hundred times larger than the trustworthiness of the subject. This observation is consistent with our pessimistic view of human nature. It should be noted that by choosing this formula, the first requirement for $R_m(i)$ discussed above is changed to be RI $$\lim_{RI \to 0+} R_m(RI) \approx 0$$

This is acceptable since the risk at such a low level is usually well within the acceptable range. If it is desirable to take risk mitigation into consideration, the formula becomes:

$$R_m(RI) = 1/(1 + \exp((-k) \times (e_m(RI) - \text{mid})))$$

where $e_m(RI)$ is a residual risk after mitigation.

A further assumption may be made that the $R_m(i)$ for sensitivity levels and the $R_m(i)$ for a category are independent of each other. The rationale behind this assumption includes the following. View the risk computed from sensitivity levels as the "risk of being tempted", in other words, the risk of a subject disclosing sensitive information intentionally for its own gain. The more sensitive the information or the less trustworthy the subject, the higher the risk is. The risk computed from a category may be viewed as the risk of "inadvertent disclosure or use". It is generally very hard to divide a piece of information into the "need-to-know" and "no-need-to-know" partitions while still maintaining the original context of the information. Therefore, once a subject, even a very trusted one, absorbs some information, which it has no (strong) need-to-know, there is a chance the subject will inadvertently disclose or use the information.

Figure 6:
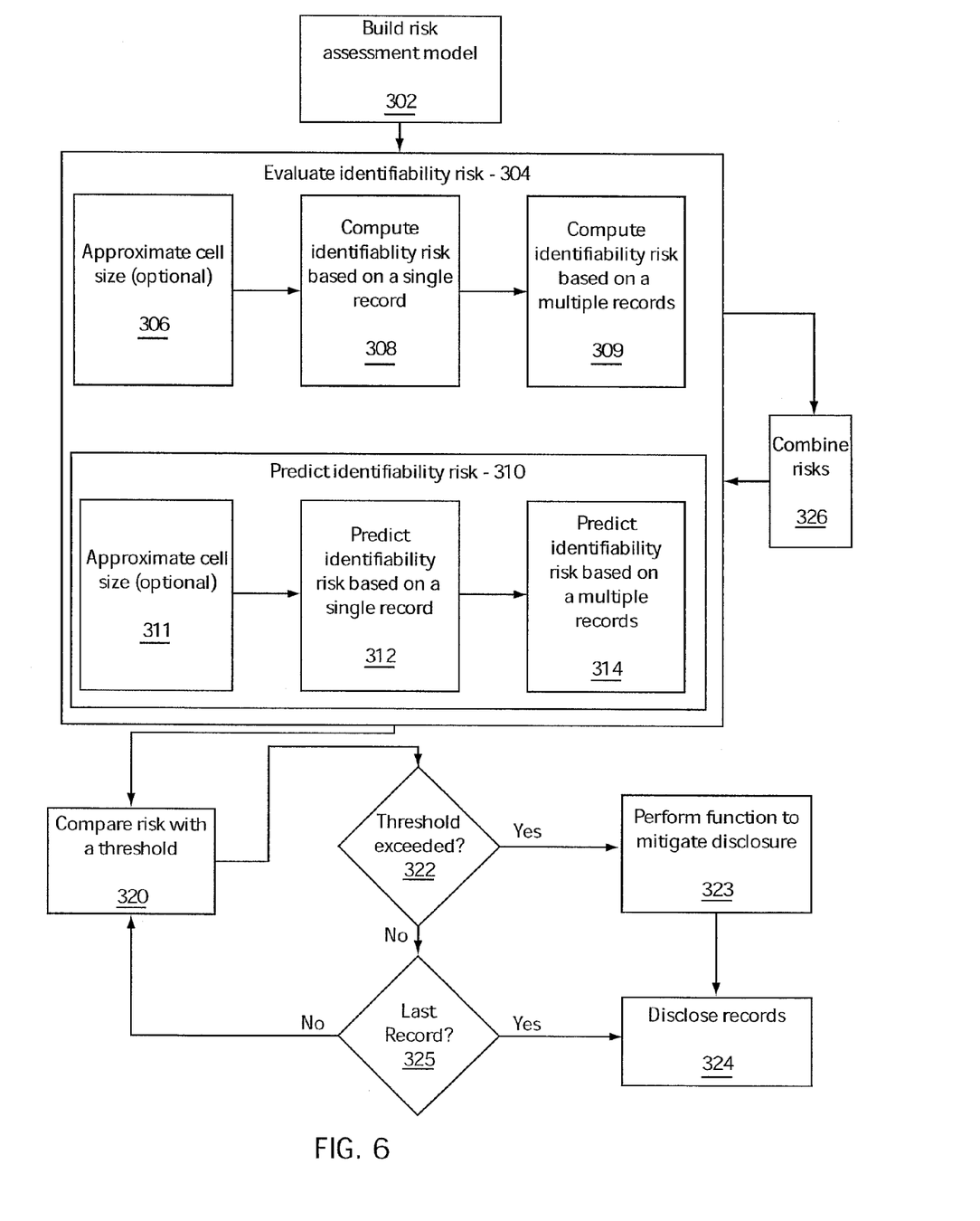
FIG. 6 is a block/flow diagram showing a system/method for risk assessment and privacy protection in accordance with an illustrative embodiment.

Referring to FIG. 6, a system/method for privacy protection and/or risk assessment is illustratively shown in accordance with one exemplary embodiment. In block 302, build a risk determination model, preferably, using records having a highest identifiability for a combination attributes.

In block 304, identifiability risk is evaluated for one or more records in storage using a risk assessment model. This evaluation may include computing identifiability risk for a given record, e.g., based on a reciprocal of a subset of records or cell size from a population table that includes only the records that have values of all attributes in a set of key attributes included in the given record in block 308. In block 306, the cell size may be approximated if the actual cell size information is not available. In block 309, the evaluating may include computing identifiability risk for multiple records, e.g., by subtracting from 1: a sum of 1 minus the identifiably risk for all records in a sample table.

Alternately, the identifiability risk may be predicted for records input to an information system in block 310. In block 312, the prediction may be for a single record identifiability risk for a given record, e.g., knowing a set of key attributes, summing over a population: a probability that an individual is the one appearing in a sample table divided by a cell size for each record corresponding to the individual. In block 311, the cell size may be approximated. In block 314, the identifiability risk may be predicted for each of multiple records by, e.g., subtracting from 1: 1 minus the single record identifiably risk to exponent m, where m is the number of records.

In block 320, the identifiability risk (or combined risk) is compared with a threshold to determine whether the one or more records can be disclosed to a third party without violation of privacy criteria. This may be performed prior to disclosing the one or more records to the third party. A determination of whether the identifiability risk exceeds a threshold is made, in block 322. If the threshold is exceeded, a function is performed in block 323 to mitigate unauthorized disclosure of the records to the third party. This may include preventing the record from being disclosed, preventing all records from being disclosed, and/or observe the data received by the third party principal and determine the true risk. Otherwise, a check as to whether the last record to be checked has been reached is made in block 325. If the last record not has been reached, return to block 320. Otherwise disclose the record in block 324. A determination for each record can be made and each record may be disclosed one at a time or in blocks of records.

In block 324, the one or more records are disclosed if disclosure is acceptable based on the comparing step in block 320. Risks may be combined into a combined privacy risk model configured to combine risk assessment for a plurality of risk factors in block 326. A combined risk threshold can be established and employed as the threshold in block 322.

Automated planning methods can be used to compose and rearrange the components of the data processing application automatically in order to manage privacy risk while satisfying requirements on produced data specified by the end users. In particular, the components may include privacy filters that filter out or modify (e.g., anonymize) the sensitive data. Including these components in the composition may reduce privacy risk associated with data disclosure. It is possible to use the risk assessment method described herein within the automated planning framework. The assessed risk value will be different for different sets of produced output. The value will also depend on other factors, e.g., as described above. All of these factors can be changed by changing the composition of processing components, and therefore the planner may be able to create a composition that has expected privacy risk below a given threshold, or has minimal possible risk of all possible compositions. This can be achieved, for example, by creating all possible compositions and computing risk assessment for each composition.

Having described preferred embodiments of a system and method for privacy protection using identifiability risk assessment (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A privacy risk assessment system comprising:
an information system comprising a computer-readable program stored on a non-transitory computer readable medium configured to disclose information to a third party, said program including
a risk determination model configured to compute identifiability risk for a given set of attributes in one or more records r of a population table, the identifiability risk being computed using probability computations based on a cell size that comprises a subset of records from the population table that have values of attributes which are equal to values of the given set of attributes in the one or more records, the identifiability risk being based on the estimate of probability that information in the one or more records disclosed to the third party can be used by the third party to identify a person, and the identifiability risk being compared to a threshold prior to being disclosed to the third party, wherein the information system is informed of the identifiability risk exceeding the threshold prior to disclosure to the third party,
and wherein the risk determination model is further configured to predict identifiability risk based on approximated values of the cell size, wherein the prediction of identifiability is made based on a probability density function over n individuals in the population table.

2. The system as recited in claim 1, wherein the information system builds the risk determination model using records r which belong to cells having a highest identifiability for a predefined combination of attributes K.

3. The system as recited in claim 1, wherein the risk determination model computes identifiability risk for a given record based on a reciprocal of a subset of records or the cell size from the population table that comprises only the records that have values of all attributes in a set of key attributes included in the given record.

4. The system as recited in claim 3, wherein the cell size is approximated.

5. The system as recited in claim 1, wherein the risk determination model computes identifiability risk for each of multiple records by subtracting from 1: a sum of 1 minus the identifiability risk for all records in the cell size.

6. The system as recited in claim 1, wherein the risk determination model predicts a single record identifiability risk for a given record, knowing a set of key attributes, by summing over a population: a probability that an individual is the one appearing in a sample table divided by the cell size for each record corresponding to the individual.

7. The system as recited in claim 1, wherein the cell size is approximated.

8. The system as recited in claim 1, wherein the risk determination model predicts identifiability risk for each of multiple records by subtracting from 1: 1 minus the single record identifiability risk to exponent m, where m is the number of records.

9. The system as recited in claim 1, wherein the approximated value of a cell size $D_K(r)$ is based on the following formula:

$$D_K(r) \approx \tilde{D}_{K_1 \ldots K_w}(r) = \frac{D_{K_1}(r) \cdot D_{K_2}(r) \cdot \ldots \cdot D_{K_w}(r)}{n^{w-1}}$$

where $D_K(r)$ is the number of records in the population table that have values of all attributes in the set of key attributes K equal to values of corresponding attributes in r, and where $K=K_1 \oplus K_2 \oplus \ldots \oplus K_w$, w is a total number of sets K, and n is the size of the population.

10. A method for privacy protection, comprising:
evaluating identifiability risk, using a processor, for a given set of attributes in one or more records of a population table stored on a non-transitory computer-readable medium using a risk assessment model, the identifiability risk being computed using probability computations based on a cell size that comprises a subset of records from the population table that have values of attributes which are equal to values of the given set of attributes in the one of more records, the identifiability risk being based on the estimate of probability that information in the one or more records disclosed to the third party can be used by the third party to identify a person;
predicting identifiability risk based on approximated values of the cell size based on a probability density function over n individuals in the population table.
comparing at least one of or a combination of the evaluated identifiability risk and predicted identifiability risk with a threshold to determine whether the one or more records can be disclosed to a third party without violation of privacy criteria; and
disclosing the one or more records if disclosure is acceptable based on the comparing step.

11. The method as recited in claim 10, further comprising, prior to disclosing the one or more records to the third party, detecting whether the identifiability risk exceeds a threshold and performing at least one function to mitigate unauthorized disclosure of the records to the third party, wherein said at least one function includes preventing all records from being disclosed and observing the data received by the third party.

12. The method as recited in claim 10, further comprising building the risk determination model using records having a highest identifiability for a combination of attributes.

13. The method as recited in claim 11, wherein the approximated value of a cell size $D_K(r)$ is based on the following formula:

$$D_K(r) \approx \tilde{D}_{K_1 \ldots K_w}(r) = \frac{D_{K_1}(r) \cdot D_{K_2}(r) \cdot \ldots \cdot D_{K_w}(r)}{n^{w-1}}$$

where $D_K(r)$ is the number of records in the population table that have values of all attributes in the set of key attributes K equal to values of corresponding attributes in r, and where $K=K_1 \oplus K_2 \oplus \ldots \oplus K_w$, w is a total number of sets K, and n is the size of the population.

* * * * *